(12) United States Patent
Viaud et al.

(10) Patent No.: US 6,883,422 B2
(45) Date of Patent: Apr. 26, 2005

(54) ROUND BALER BINDING ARRANGEMENT INCLUDING TWINE TENSION CONTROL

(75) Inventors: Jean Viaud, Gray (FR); Raymond Uros, Gray (FR); Jérôme Repellin, Autrans (FR)

(73) Assignee: Deere & Company, Moline, IL (US)

( * ) Notice: Subject to any disclaimer, the term of this patent is extended or adjusted under 35 U.S.C. 154(b) by 32 days.

(21) Appl. No.: 10/284,520

(22) Filed: Oct. 29, 2002

(65) Prior Publication Data

US 2003/0089560 A1 May 15, 2003

(30) Foreign Application Priority Data

Oct. 30, 2001 (DE) .......................... 101 53 517

(51) Int. Cl.[7] .......................... B65B 13/02; B65B 13/18
(52) U.S. Cl. ................. 100/2; 100/5; 100/6; 100/19 A
(58) Field of Search .......................... 100/2, 3, 5, 19 A, 100/30, 13, 15, 8, 4, 88, 64; 56/341, 342, 343; 53/399, 430, 110

(56) References Cited

U.S. PATENT DOCUMENTS

| | | |
|---|---|---|
| 2,781,719 A | 2/1957 | Hedtke |
| 3,910,178 A | 10/1975 | Eggers et al. |
| 4,011,807 A | 3/1977 | Kobiella ........................ 100/2 |
| 4,282,803 A | 8/1981 | Cools |
| 4,439,975 A | 4/1984 | Laing ........................... 53/399 |
| 4,612,855 A | 9/1986 | Wagstaff et al. |
| 4,796,524 A | 1/1989 | Renoud |
| 5,215,005 A * | 6/1993 | Schlotterbeck et al. ........ 100/5 |

FOREIGN PATENT DOCUMENTS

| | | |
|---|---|---|
| DE | 11 03 067 | 3/1961 |
| DE | 24 48 645 | 4/1975 |
| DE | 34 32 251 | 3/1986 |
| DE | 36 40 696 | 6/1988 |
| DE | 36 17 155 | 7/1988 |
| DE | 34 45 060 | 3/1990 |
| DE | 29 47 388 | 10/1990 |
| DE | 195 17 385 | 11/1996 |

* cited by examiner

*Primary Examiner*—Allen Ostrager
*Assistant Examiner*—Jimmy T Nguyen

(57) ABSTRACT

A binding arrangement and a process for the control of a binding arrangement is described that includes a binding material delivery arrangement, a cutting arrangement and a braking arrangement for the binding material, where the brake can be controlled and generates a variable braking force. To improve the binding process for harvested crop, brakes for the binding material are applied with which a binding material tension is generated or is increased to cause the binding material to be retarded during the binding process in opposition to the flow of the binding material. The brakes are controlled such that only a low binding material tension is caused at the beginning of the binding process to increase the tension to as large a value as possible during the continuing binding process and to reduce the tension upstream of the cutting arrangement again at the end of the binding process. This control is done through a control arrangement, as a function of the binding material delivery conditions, and performs at least two changes in braking force within one binding cycle.

10 Claims, 6 Drawing Sheets

ROUND BALER BINDING ARRANGEMENT INCLUDING TWINE TENSION CONTROL

FIELD OF THE INVENTION

The invention concerns a binding arrangement and a process for the control of a binding arrangement with a binding material delivery arrangement, at least one binding material separating or cutting means and at least one brake for the binding material, where the brake can be controlled and generates a variable braking force.

BACKGROUND OF THE INVENTION

In harvesting operations, various binding materials are applied nowadays such as twines, nets or plastic foils with which the harvested crop formed into bales is enclosed or bound in order to simplify their handling.

Here, the tension of these binding materials should be high enough to assure a proper binding process. This tension is generated by braking or advancing arrangements in which the binding material is retarded during the binding process against the flow of the binding material stream.

DE 195 17 385 discloses a large round baler for harvested agricultural crop in which one binding arrangement is applied that includes an advancing pulley drive for the binding material such as, for example, twines, nets or foils, where the binding arrangement is provided with a braking arrangement that is switched over the advancing pulley drive in order to bring about a tension in the binding material during the binding process of the bale. The braking arrangement proposed here is connected over a linkage with the advancing pulley drive, and is applied as soon as the advancing drive is stopped, where the binding tension that was generated is maintained to the end of the binding process.

Large round balers, without advancing arrangements, have the advantage that their configurations are less costly and operate with lower levels of trouble. At high values of binding tensions, there are however, occasional problems at the start of the binding process when the retaining force on the binding material, that was generated by the rotary movement of the bale and the friction forces generated thereby on the binding material, is not sufficiently large. The result is that the binding material slips and that the binding material is not carried along after its capture.

Nevertheless, the highest possible tensions in the binding material are necessary in order to obtain good results during the binding process.

A solution for the configuration of a twine brake, that makes possible a varying tension during the binding process, is disclosed by DE 24 48 645. Here, a manual crank is used to control the position of a twine supply arm that is coupled to a pivot disk and initiates the dispensing of the binding material into the baling chamber. At the beginning of the binding process, but only after the capture of the twine by the bale, a spring mechanism is triggered as a function of the position of the pivot disk. The spring mechanism applies tension to the twine until the end position of the twine supply arm is reached after the twine has been cut by a knife. Before the beginning of the next cycle, the twine supply arm or the pivot disk is returned to the initial position and the spring mechanism is blocked. Thereby, the twine can be grasped quasi tension-free during the capture process.

Aside from these and other advantages, the binding arrangements or binding processes known from the state of the art, do however, have disadvantages.

The large round baler described in DE 195 17 385 is provided with a twine or foil guide whose tension is brought into compliance by an advance pulley drive. However, the disadvantage here is that the advance pulley drive requires higher manufacturing costs, since a larger design and technical expense must be applied, whereby in turn, the failure rate of the entire arrangement is increased.

The binding arrangement proposed in DE 24 48 645 provides for a manual control of the binding material delivery arm as a function of which a brake is actuated that increases the tension in the binding material after the twine has been grasped by the bale and maintains this tension up to the end position of the binding material delivery arm after the twine has been cut. If the tension in the twine is too high, the twine is relaxed elastically at too high a rate at the end of the binding process when the twine is cut. The result of this is that the twine recoils and wraps itself around parts or elements of the binding arrangement. Thereby, the beginning of the binding process for the following binding cycle cannot be initiated, resulting in an interruption of the process sequence.

The problem underlying the invention is seen in the need to develop, at the beginning of the binding process, only a low binding tension in order to simplify the beginning process, to increase the tension during the continuing binding process to a level as high as possible in order to attain the highest possible compression values during the binding process, and to reduce the tension again at the end of the binding process so that the problems noted initially are overcome. In particular, high cost configurations for the binding material delivery arrangement, on the one hand, should be avoided, and on the other hand, a delivery of the binding material should be accomplished independently of the operator.

SUMMARY OF THE INVENTION

The problem is solved according to the invention by the provision of a binding arrangement or a binding process having the ability to change the tension in the binding material by adjusting a braking force applied to the binding material, as a function of binding material delivery conditions.

According to the invention, a binding arrangement is proposed that controls a first brake for the binding material by means of a control device coupled to the binding material delivery arrangement which controls the first brake as a function of binding material delivery conditions and performs at least two changes in braking force within one binding cycle. The process for the control of this brake provides, aside from an increase in the braking force performed after the beginning of the binding cycle, a further change in the braking force that occurs before the separation or cutting of the binding material so that the braking force is reduced or is minimized. In addition, further changes in the braking force can be performed between the aforementioned changes in the braking force, for example, changes in the braking force following each other at intervals, in which the braking forces are increased or reduced as required.

The beginning of the binding material delivery characterizes a binding material delivery condition in which the binding material is carried along by the harvested crop. A second binding material delivery characteristic follows in which the round bale of harvested crop is bound along its circumference under increased tension before a further binding material delivery characteristic occurs in which the end of a binding material delivery cycle is initiated. Here the binding material is cut by a separating arrangement after it has been lashed down tightly, knotted, retained with adhesive or fastened by other means.

In a preferred embodiment of the control, further changes in the braking forces can also be attained as a function of other binding material dispensing cycle conditions. For example, before the end of the binding cycle, an additional increase in the binding material tension can be initiated. Thereby, a particularly secure, tightly lashing-down of the binding material can be assured, before the tension is removed from the binding material shortly before the separation process, by the last change in braking force within the binding cycle.

The application of a second brake, that is positioned behind or downstream of the separating arrangement, supplies the force required for the lashing-down of the binding material and thereby reduces the load on the controllable brake so that the separating process can be performed "at low tension" as described initially. A possible configuration of this brake in the form of a spring, as well as suggestions for alternative solutions, are described in U.S. application Ser. No. 10/156,328, filed May 24, 2002, for application in a large round baler.

The invention provides that the control of the binding material brake be performed automatically as a function of binding material delivery, and more particularly, as a function of the binding material delivery arm condition. For this purpose, control means are applied that are coupled with the binding material delivery arm, as well as with a binding material brake, and generate a controllable braking force or a control force acting upon the brake, where these characteristics can be attained by mechanical and/or electric and/or magnetic and/or hydraulic and/or pneumatic means.

The binding arrangement disclosed here provides for the application of band-shaped binding materials such as, for example, twines, wires or sheet metal bands. Furthermore, the process for the control of a binding arrangement is also provided for the application to binding means for the covering of surfaces, such as for example, nets or plastic foils. For the use of band-shaped binding materials, the criterion here is that the binding material delivery arrangement can supply more than one strand, strip or band of binding material during a delivery of binding material to the bale to be bound, preferably with the use of more than one delivery arm operating in parallel with each other. Thereby, for example, the binding process is strengthened or shortened by a corresponding arrangement of the delivery arms. In the case of the delivery of more than one strand, strip or band of binding material, the application of at least one binding material brake for each binding material strand, strip or band is provided or the application of at least one binding material brake that overlaps several binding material bands, strips or strands to brake them together.

A mechanism is actuated by mechanical means that, for example, controls two brake bodies in their braking contact pressure that are arranged opposite each other, connected with each other so as to be movable and preloaded by preloading means, such as compression springs, that raises or lowers the braking force generated by the compression springs, that is, controls the braking force. Here the brake bodies are configured as plate-shaped sheet metal components of which the first brake body is rigidly anchored to a carrier frame and the second is coupled to the first brake body by guide pins.

The binding material is conducted between the brake bodies and is braked by the contact pressure of the two brake bodies, whereby tension is generated in the binding material.

The change in the preloading force of the preloading means, configured as compression springs, is actuated by control elements that are connected with a binding material delivery arm, and are controlled over a control arch as a function of the position of the binding material delivery arm. The control arch is rigidly connected with the second brake body and causes a change in the distance between the two brake bodies, corresponding to its arch-shaped contour. The change in distance, in turn, controls the contact pressure of the brake bodies to each other and thereby controls the braking force. By differing designs of the contour of the control arch, varying changes in braking force in amount and direction can be brought about during the traversing of the control arch by the control means.

In a variation of this concept, the configuration of the brake can utilize electromagnets that are controlled electronically, that force one or more brake bodies against the binding material, and brake the binding material by generating a friction force. In this case, the braking force can be controlled by a current or voltage control arrangement as a function of the position of the binding material dispensing arms.

BRIEF DESCRIPTION OF THE DRAWINGS

The drawing shows an embodiment of the invention on the basis of which the invention, as well as further advantages and further advantageous developments and embodiments of the invention, shall be explained and described in greater detail in the following.

DESCRIPTION OF THE EMBODIMENT

At the outset, it should be noted that the designations "right" and "left" used in the following description, are made with reference to a person standing behind, and facing in the forward operating direction of, a large round baler.

Figure 1:
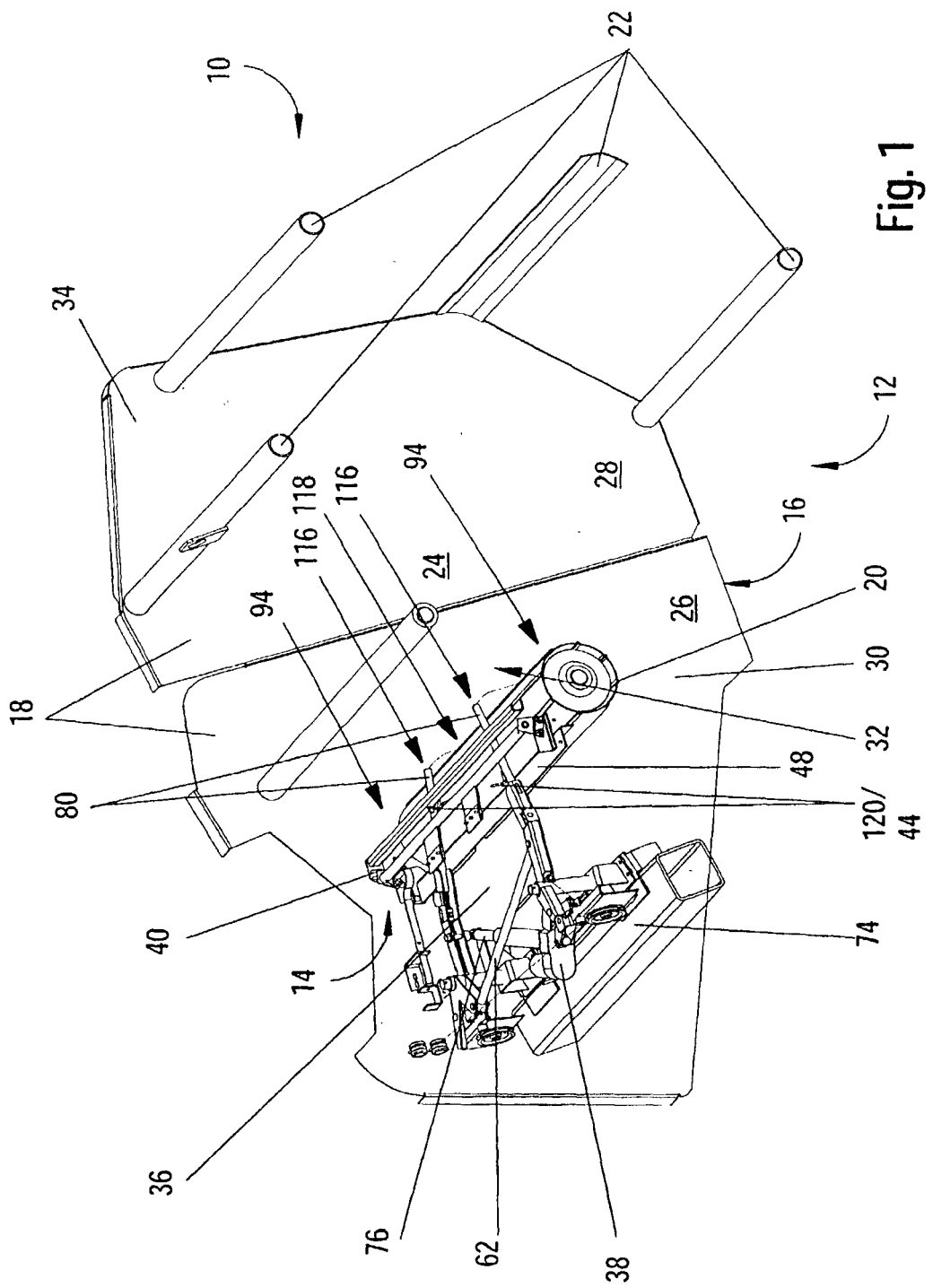
FIG. 1 is a somewhat schematic, perspective view of a binding arrangement of a large round baler constructed in accordance with the present invention.

Referring now to FIG. 1, there is shown a large round baler 10 of which a chassis 12 and a binding arrangement 14 can be seen.

The large round baler 10 may be any type of large round baler, e.g., a baler having a baling chamber of fixed size or a baler with a variable baling chamber, that are applied for the baling of harvested crop, such as for example, grass or cotton or other materials, such as for example, garbage. Large round balers 10 of this type are offered, for example, by JOHN DEERE® under the designation "Baler 575" and therefore do not require any further detailed explanation. It should merely be noted that such a large round baler 10 is supported on wheels, moved over the ground, and thereby uses a crop take-up or pick-up arrangement, not shown, to take up harvested crop, which is shaped into a cylindrical bale and is bound by means of the binding arrangement 14.

Among other items, the chassis 12 includes a frame 16 having side walls 18, and being connected with a towbar, not shown, as well as with a running gear that is arranged between the side walls. Between the side walls 18, baling elements 20 (only one is shown) and transverse struts 22, are arranged. Together with the side walls 18, the baling elements form a baling chamber 24.

The frame 16 is configured in known manner as a weldment that holds together or carries the transverse struts 22, the towbar, the running gear, the take-up arrangement, the side walls 18, the baling elements 20, as well as, the binding arrangement 14.

The side walls 18 border at the sides of the baling chamber 24 and are divided approximately vertically into a forward half 26 and rear half 28.

The running gear includes, in each case not particularly designated, an axle and wheels with which the chassis 12 is supported on the ground. The running gear is rigidly connected with the chassis 12.

The baling elements 20 are configured as rolls that operate as the surrounding border of the baling chamber 24. The baling elements 20 leave an opening between them as an inlet 30 for the crop to be baled in the form of a first slot and a binding material inlet 32 to the baling chamber 24 that is formed by a second slot. The baling elements 20 are shown in the present embodiment as rolls, but can also be configured for the same purpose as belts or bands, as well as, bar chain conveyors or other tensioning means.

The baling chamber 24 is invariable in size and takes in the crop to be baled that is rolled into a bale, where the crop to be baled is taken in through the inlet 30 for the crop to be baled.

The inlet 30 for the crop to be baled is preceded by a pick-up or take-up arrangement that is known in itself, which picks up the crop to be baled from the ground and conducts it through the inlet 30 into the baling chamber 24.

The forward and rear halves 26, 28 of the baling chamber 24 have their respective opposite walls interconnected by transverse struts 22 such that the halves are torsionally stiff, with the side walls of the rear half 28 forming a housing component 34 that can be pivoted vertically. By raising the housing component 34 by means of a pivoting mechanism, not shown, the completed bale can be ejected from the baling chamber 24.

Figure 3:
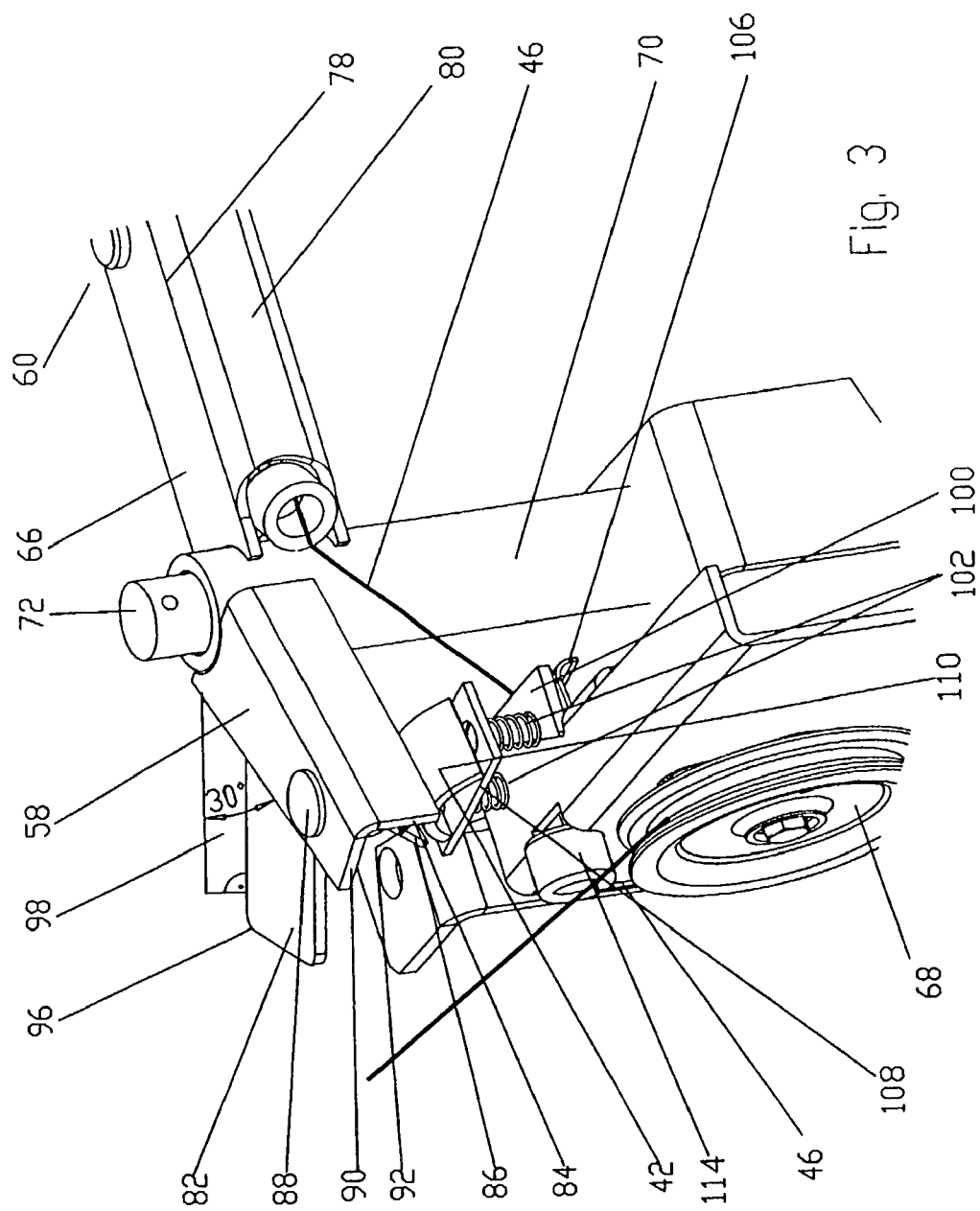
FIG. 3 is a perspective view showing components of the binding arrangement incorporating the brake.
Figure 4:
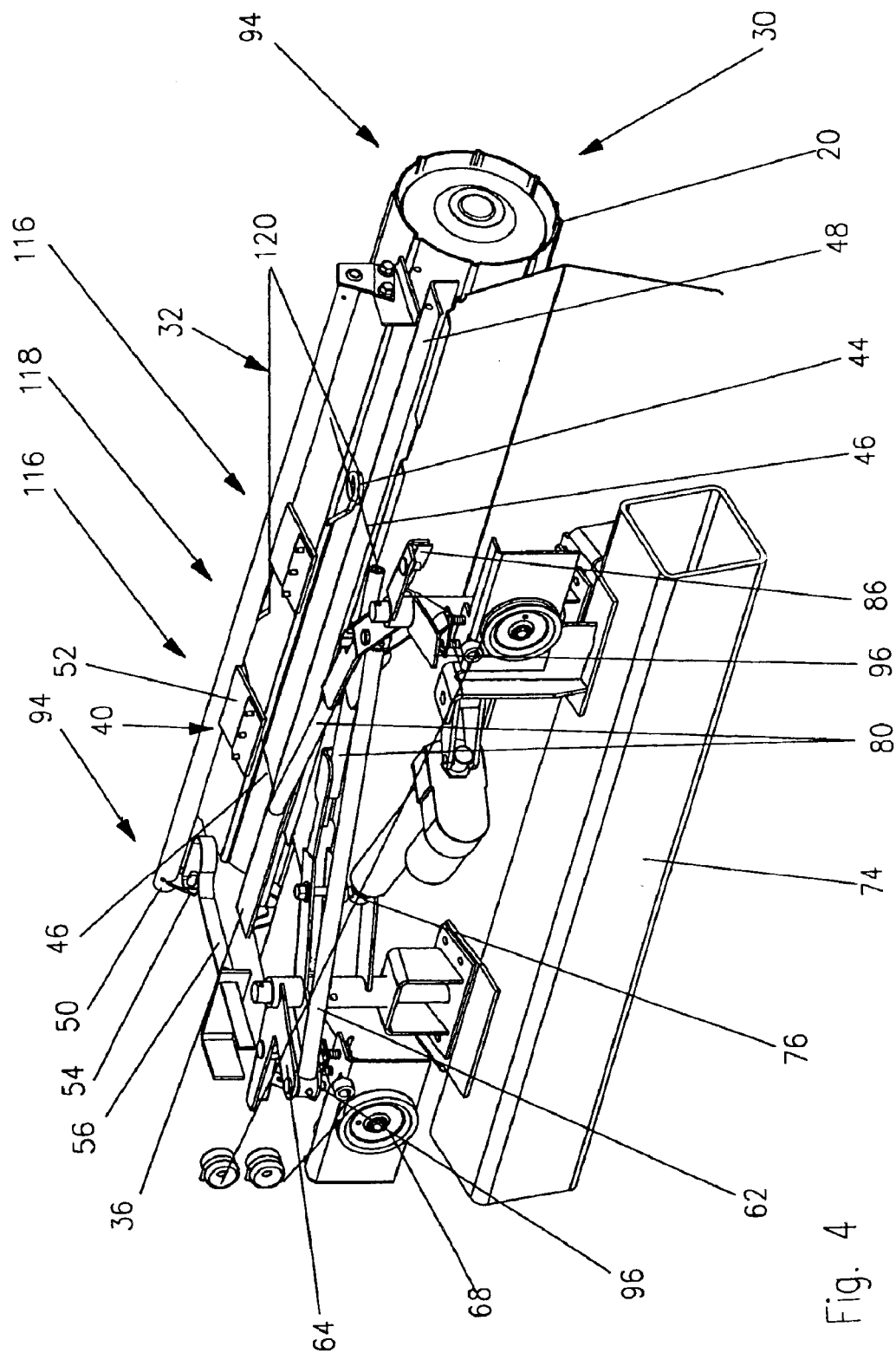
FIG. 4 is a perspective view of the binding arrangement shown in its condition at the end of the binding process.

Referring now also to FIGS. 3 and 4, it can be seen that the binding arrangement 14 includes, among other items, a binding material delivery arm arrangement 36, a servo motor 38, a twine supply container, not shown, a cutting arrangement 40, first brakes 42, and second brakes 44.

The binding arrangement 14 is used to enclose the completed bale of harvested crop, after the baling process, with binding material 46 (FIGS. 3 and 4). For this purpose, the binding material 46 is delivered by the binding material delivery arm arrangement 36 to the binding material inlet 32 of the baling chamber 24 and is there carried along by the rotating bale. At that time, the servo motor 38 moves the binding material arm arrangement 36, by means of which the binding material 46 is delivered along the axis of the bale and the rotating bale is bound along its circumference. After the binding process, the binding material 46 is separated from the bale by the cutting arrangement 40 and the bale is ejected from the baling chamber 24.

The cutting arrangement 40 includes a fixed anvil rail 48 that is attached between the side walls 18, a folding cutting rail 50, on which knives 52 are arranged for the separation of the binding material 46, as well as an actuating mechanism 54, that is actuated through the agency of a sheet metal spring 56 contacted by a first control device 58 of the upper binding material delivery arm 60, according to FIG. 1. The cutting arrangement 40 is oriented between the first and second brakes 42 and 44, respectively, in such a way, that at the end of the binding process, the binding material 46 is guided across the anvil rail 48 of the cutting arrangement 40. Here, the first control device 58 of the upper delivery arm 60, according to FIG. 1, engages and thereby actuates the sheet metal spring 56 at the end of the binding process, whereby the actuating mechanism 54, in a well known manner, punches the knives 52 by folding downward the cutting rail 50 onto the binding material 46, extending across the anvil rail 48, and thereby severs or separates the binding material 46 from the bale.

In this special binding material delivery arm arrangement 36, two binding material delivery arms 60 are provided that are joined to each other by a coupling rod 62. Each delivery arm 60 conducts binding material 46 in the form of binding twine to the binding material inlet 32 and is equipped with a first control device 58 for the control of the first brake 42 and with a guide channel 66 for the guidance of the binding material 46. Furthermore, binding material pulleys 68 are provided, over which the binding material 46 is conducted to the delivery arm 60, by binding twine supply pulleys, not shown.

Each of the binding material delivery arms 60 is supported for pivoting horizontally, and for that purpose, is joined to a vertical bearing bushing 70 received on a vertical bearing journal or post. Thus, pivotal movement of the arms 60 results in their respective free ends sweeping a path extending lengthwise relative to the axis of the bale, with it being noted that the left arm 60 is at an elevation higher than the right arm so that they do not interfere with each other when pivoting to deliver wrapping material to outer ends of the bale, this condition being shown in FIG. 4. The bearing journals 72 are retained by a horizontal, transverse tubular support member 74 that is attached between the two walls of the forward chamber half 26. The first control device 58, as well as the guide channel 66, are both rigidly connected to, and respectively extend in opposite directions from, the bearing bushing 70 of the delivery arms 60.

The servo motor 38 is an electric motor that is controlled manually or by means of an electronic control unit. The control is performed by sensors or manually. The servo motor 38 is used to drive the binding material delivery arms 60 in their pivoting movement, and hence, to coordinate the various positions of the arms 60. As can best be seen in FIG. 4, the servo motor 38 has a base end attached by a flange to the tubular support member 74 at a location adjacent the mounting of the left delivery arm 60 and a control spindle 76 at its other end connected with the guide channel 66 of the right delivery arm 60. Operation of the servo motor 38, to extend or retract the spindle 76, results in the dispensing end of the right delivery arm 60 sweeping horizontally back and forth across the circumference of the formed bale. At that time, the left delivery arm 60 is controlled as a function of the position of the right delivery arm 60, by means of the coupling rod 62, which connects the first control device 58 of the right delivery arm 60, with the channel member 66 of the left delivery arm 60.

The guide channels 66 each include a pair of parallel flanges 78, and form an arm to which a binding twine guide or delivery tube 80 is attached in a location between the flanges 78. Each of the binding twine guide tubes 80 is arranged in such a way that it can be moved into the binding material inlet 32 at the beginning of the binding process. Then, the binding material 46 extends through the binding twine guide tube 80, is conducted to the binding material inlet 32, hangs there into the baling chamber 24, and is carried along by the rotating bale.

Before the binding material 46 reaches the binding twine guide tube 80, it is conducted over the binding material pulley 68 to a respective first brake 42 and is braked there to a greater or lesser degree as a function of the condition of the binding process, which brings about a binding material tension.

The control of these braking processes or of the first brake 42 is performed in each case by the first control device 58 that includes, in each case, the first control device 58 and a second control device 82 (FIG. 3). The control devices 58, 82 are rigidly connected with the bearing bushing 70 of the delivery arm 60 and perform a control movement corresponding to the pivoting movement of the guide channel 66 or the binding twine guide tube 80.

Figure 2:
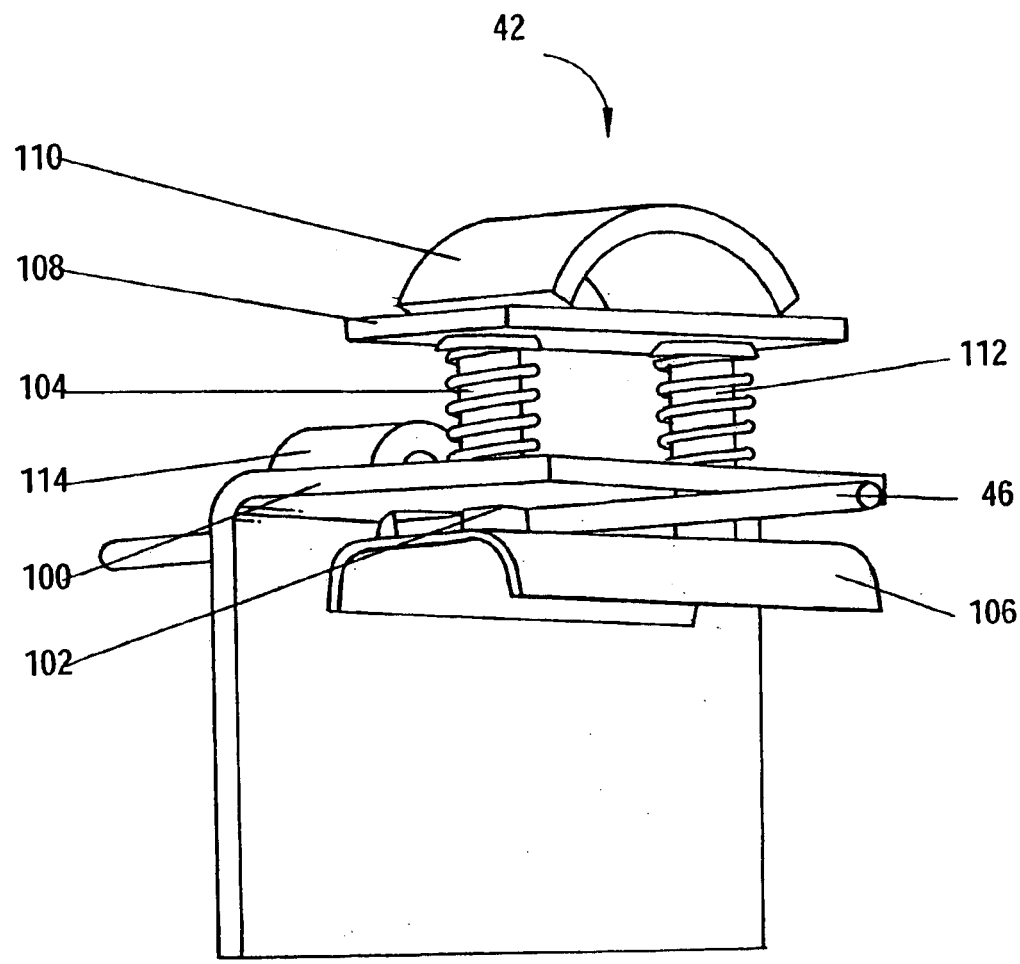
FIG. 2 is a perspective illustration of a brake coupled to a binding material delivery arm for being controlled mechanically.

The first control device 58, in each case, consists of a drawn-out angle member 84 that is rigidly connected with the bearing bushing 70 and extends radially from it. A control hinge 86 is located on this angle member 84, as can be seen in FIGS. 2 and 4, that is fastened by a fastening device 88 in the form of a retaining pin through a horizontal leg 90 of the angle member 84 and is supported on one side by a vertical leg 92 of the angle member 84. The result of the one-sided support of the control hinge 86 is that the first control device 58 operates in only one pivoting direction or that the control hinge 86 folds together during a reversal of the pivoting direction at the side of a binding material inlet 94.

The second control device 82 consists, in each case, of a flat plate 96 also extending radially from the bearing bushing 70, that is rigidly connected with the bearing bushing 70, and is arranged at a control pivoting angle 98 of approximately 30° from the first control device 58. Corresponding to the fixed control pivot angle 98, the point in time for the second opening of the first brake 42 is established and is selected by means of the control pivot angle 98 in such a way that it occurs shortly before or during the separation of the binding material by the cutting arrangement 40.

In the detailed view in FIG. 2, the individual components of the first brake 42 can be seen. FIG. 3 clarifies the control mechanism of the first control device 58 for the control of the first brake 42.

The first brake 42 includes a first brake body 100 that is defined by a horizontal leg of an inverted L-shaped support member having its vertical leg rigidly connected with the tubular support member 74. In the brake body 100, guide bores 102 are provided through which cylindrical guide pins 104, extending parallel to each other, are conducted. The guide pins 104 are connected rigidly at their lower ends with a second brake body 106 in the shape of a brake plate. At the upper end of the guide pins 104, a control plate 108 is fastened to which a control arch 110 is attached. Thereby, the brake body 100 is located between the control plate 108 and the brake body 106, both of which are connected to each other rigidly by the guide pins 104. On the guide pins 104, pre-load devices 112, configured as compression springs, are attached between the control plate 108 and the brake body 100. The pre-load devices 112 force the control plate 108 and the brake body 100 away from each other, whereby the brake body 106 is forced against the underside of the brake body 100. The binding material 46 is guided by means of a grommet 114 between the underside of the brake body 100 and the upper side of the brake body 106. The spring force of the pre-load devices 112 forces the brake body 106 against the underside of the brake body 100, and thereby a braking force is generated by means of which the binding material 46 is braked.

The pivoting movement of the binding twine guide tubes 80 is clarified by FIGS. 1 and 4. At the beginning of the binding process, the binding twine guide tubes 80 are brought into the position, shown in FIG. 1, in which the binding material hangs in each case into the rim region of a center one-third 116, relative to the sideways extent, of the binding material inlet 32. In the subsequent course of the binding process, the binding twine guide tubes 80 pivot in the direction of the outer region of the binding material inlet 32, at which time a pivoting direction reversal is initiated and the binding twine guide tubes 80 again move in the direction of the center of the binding material inlet 32. Then, an overlapping process follows in which the binding twine guide tubes 80 move into the more distant side of the binding material inlet side 94, until the position corresponding to FIG. 4 is reached. At that time, the binding material 46 is conducted by the binding twine guide tubes 80 in each case to a second brake 44 before the separation of the binding material is performed by the cutting arrangement 40. The separation cycle ends when the binding material guide tubes 80 are again in their initial position corresponding to FIG. 4.

From the pivoting cycle just described, there results a control cycle firmly connected to it for the first brake 42 that is determined by the control devices 58, 82 during the pivoting movement. During the binding material delivery process, the first control device 58 releases a mechanism that opens the first brake 42 so that possibly no binding material tension or only a small tension in the binding material 46 exists and it can easily be carried along by the bale. As soon as the binding material delivery process is completed and the binding twine guide tubes 80 move to the sides 94 of the binding material inlet, the first brake 42 is again applied by the first control device 58 and the tension in the binding material 46 is increased for the following binding process. So that the first control device 58 does not again open the first brake 42 during the reversal of direction of the binding material guide tubes 80 and thereby reduce the tension in the binding material, the first control device 58 in each case is configured in such a way that it is effective only in one pivoting direction.

In order to reduce the binding tension during the cutting process of the binding material 46, the second control device 82 is applied that opens the first brake 42 anew as a function of the pivoting movement.

At the beginning of the binding process, the first control device 58 pivots over the control arch 110 of the first brake 42. Due to the pivoting movement, the control arch 110 is forced downward upon the superposition of one or the other of the first and second control devices 58 and 82 at the control arch 110, respectively, through the agency of the control hinge 86 and the flat plate 96. When the control arch 110 is forced downward, it opposes the spring force of the pre-load devices 112 and the braking force is reduced or eliminated. If the control devices 58, 82 do not engage the control arch 110, the binding material 46 is braked continuously corresponding to the spring force of the pre-load devices 112.

In the last phase of the binding cycle, the binding material 46 is separated from the completed bale. To avoid problems connected with the recoil of the binding material 46 when it is being separated, at this point in time, the first brake 42 is released anew by the second control device 82 and the tension in the binding material 46 is removed. The release of the tension in the binding material 46, at the time of the separation of the binding material, prevents an automatic release of the tension in the binding material 46, which could lead to a recoil of the binding material 46 that could wrap itself around parts or elements of the binding arrangement 14 or cause it to retract into the binding twine guide tube 80.

In the aforementioned last phase, however, a high tension in the binding material is necessary so that the binding material 46 can lash itself tightly with the last windings of the binding material. The higher the binding tension is at that point, the higher the retaining force of the binding material 46 on the bale and thereby also the assurance against an unraveling of the binding material 46 from the bale when the bale is ejected.

In order to assure a high tension in the binding material during the separation process, the second brake 44 is arranged downstream of the cutting arrangement 40. In this embodiment, the configuration of the second brake 44 includes a spring 120, shown in FIG. 4, into which the binding material 46 retracts when the separation process is reached and in which a binding material tension is brought about between the second brake 44 and the bale. Such a configuration of the second brake 44 is already known and corresponds to the proposals of the aforementioned U.S. patent application Ser. No. 10/156,328, filed May 24, 2002, for the configuration of a binding twine brake for application in a large round baler.

At the point in time at which the cutting arrangement cuts the binding material 46, the tension in the binding material 46 upstream of the cutting arrangement 40 is so low that problems such as the recoiling of the binding material 46 can be avoided.

Although the invention has been described in terms of only one embodiment, anyone skilled in the art will perceive many varied alternatives, modifications, and variations in light of the above description, as well as the drawing, all of which fall under the present invention.

Figure 5:
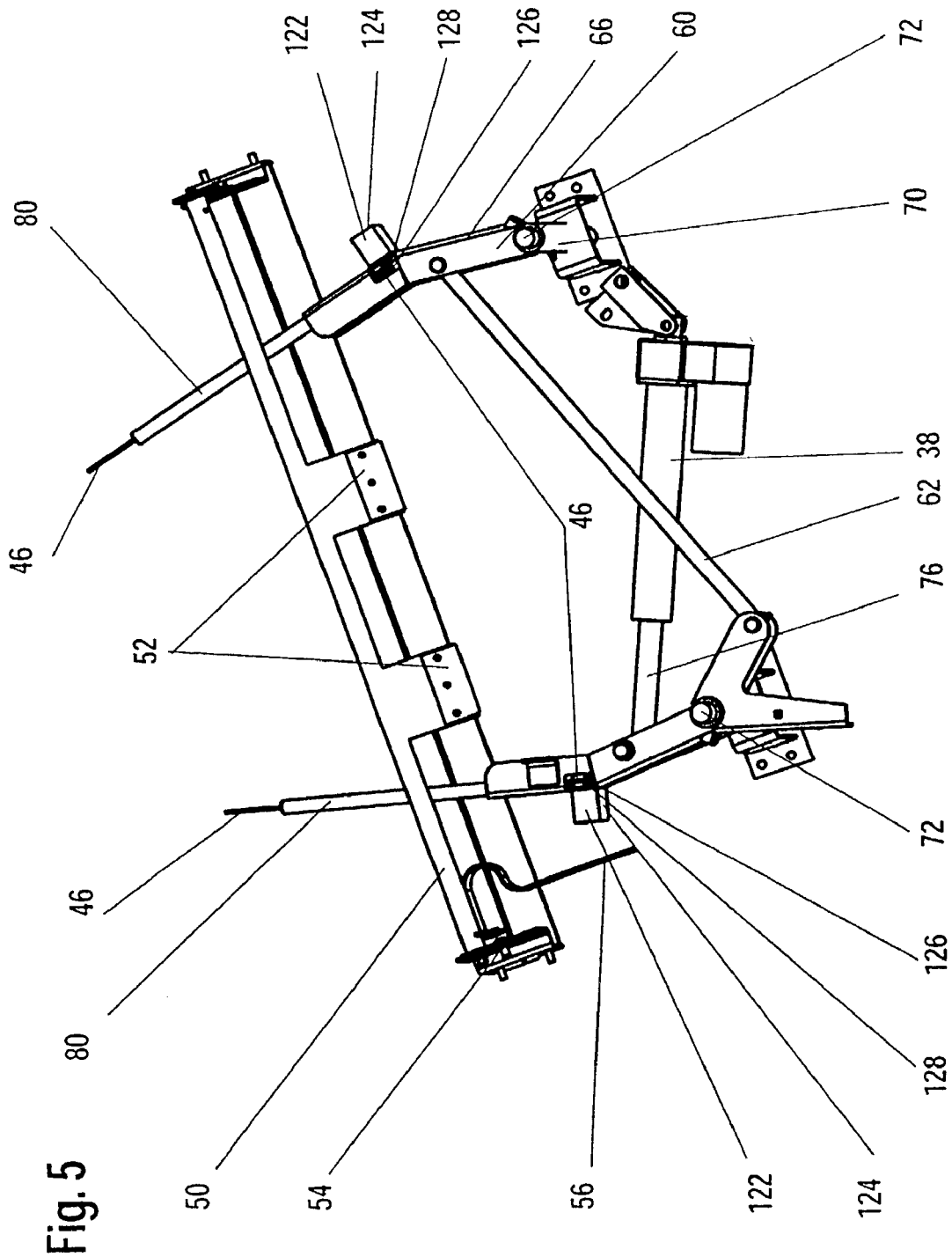
FIG. 5 is a schematic view of a second embodiment of the binding arrangement wherein the binding material brake is controlled electronically or electromagnetically.
Figure 6:
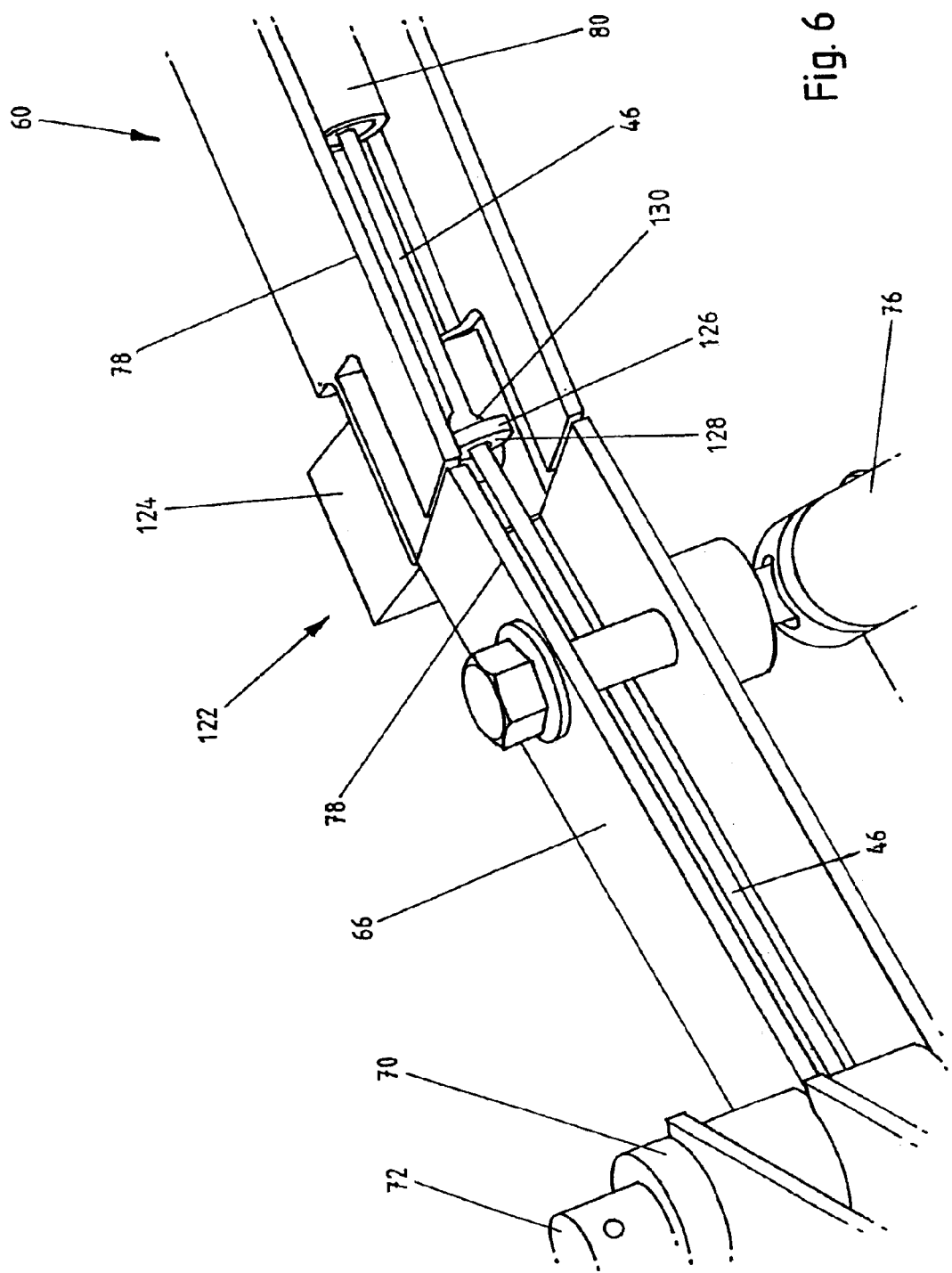
FIG. 6 is a schematic detailed view of the electronically or electromagnetically controlled brake of FIG. 5.

In that way, for example, as made clear in FIGS. 5 and 6, the binding material tension can be generated by the application of an electromagnetically controlled brake 122 in place of the first brake 42 described above. For that purpose, an electromagnet 124 is attached to the guide linkage unit 54. The electromagnet 124 moves a brake grommet 126 that extends through a bore 128 at the flange 78 of the channel member 66 of the binding material delivery arm 60. The binding material 46 is conducted through the brake grommet 126 and drawn by the brake grommet 126 into the bore 128 upon actuation of the electromagnet 124. Thereby, friction forces are generated between the binding material 46 and the edge 130 of the bore 128 or the brake grommet 126, whereby a binding material tension is brought about. The electromagnet 124 is connected to a source of current or voltage, not shown, and is controlled by an electronic control, not shown, as a function of the pivoting movement of the delivery arm 60. The control of the electromagnet 124 is performed by the electronic control automatically or manually.

Having described the preferred embodiment, it will become apparent that various modifications can be made without departing from the scope of the invention as defined in the accompanying claims.

What is claimed is:

1. In a binding arrangement for applying binding material to the circumference of a large round bale having a central axis disposed transverse to a forward direction of travel of said binding arrangement, said binding arrangement including at least one binding material delivery arm mounted for movement for selectively sweeping a delivery end of said delivery arm back and forth, during each binding cycle, between starting and ending positions spaced from each other along a transverse delivery path forward of, and extending in a direction of a length of, said bale, at least one cutting arrangement, for severing a length of wrapping material at a location between said ending position and a bound bale, at least one brake including cooperating braking surfaces for contacting the binding material, and a brake control arrangement for selectively effecting a variance in the amount of force exerted by said braking surfaces on said binding material, the improvement comprising: said brake control arrangement including control components operating as a function of the position of said delivery end of said delivery arm is during a binding cycle so as to effect at least two changes in braking force within each binding cycle; a second brake for the binding material being positioned upstream of said cutting arrangement so as to engage and brake said binding material, prior to said binding material being cut by said cutting arrangement, when said delivery arm is at said end position, whereby said second brake acts to prevent said binding material from recoiling and becoming entangled with adjacent structure when tension in said binding material is released after being severed from the wrapped bale.

2. The binding arrangement as defined in claim 1, wherein said brake control components are constructed to be selectively operated through one of a mechanical, electrical, magnetic, hydraulic or pneumatic actuator for effecting control responsive to pre-selected locations of said binding material delivery arm along said transverse path.

3. In a binding arrangement for applying binding material to the circumference of a large round bale, and including at least one binding material delivery arm mounted for movement for selectively sweeping a delivery end of said delivery arm back and forth, during each binding cycle, between starting and ending positions spaced from each other along a transverse delivery path forward of said bale, at least one cutting arrangement, for severing a length of wrapping material at a location between said ending position and a bound bale, at least one brake including cooperating braking surfaces for contacting the binding material, and a brake control arrangement for selectively effecting a variance in the amount of force exerted by said braking surfaces on said binding material, the improvement comprising: said brake control arrangement including control components operating as a function of the position of said delivery end of said delivery arm is during a binding cycle so as to effect at least two changes in braking force within each binding cycle said at least one brake includes first and second brake bodies that are respectively provided with said braking surfaces located opposite each other at a controllable distance; said first brake body being controlled and configured as a brake plate; said second brake body being fixed and provided with parallel guide bores; parallel guide pins respectively extending through said guide bores; said first brake body being fixed to lower ends of said guide pins; a control plate being fixed to upper ends of said guide pins; and said biasing arrangement acting on said second brake body so as to effect said pre-selected braking force between said first and second brake bodies; a biasing arrangement acting on said first brake body for urging the latter toward said second brake body so as to effect a pre-selected braking force; said brake control arrangement including first and second control elements coupled for movement with said at least one binding material delivery arm and associated with said at least one brake for sequentially effecting movement of said first brake body away from said second brake body in opposition to said biasing arrangement for causing a braking force less than said preselected braking force.

4. The binding arrangement as defined in claim 3, wherein said biasing arrangement is located between said control plate and said second brake body, and biases said control plate away from said second brake body.

5. The binding arrangement as defined in claim 4, wherein said binding material delivery arm is mounted for pivoting about an upright axis; and said first and second control elements being mounted to said arm for pivoting about said axis and being positioned for applying a control force to said control plate, which results in a change in the distance between said first and second brake bodies, and, hence, in a change in the braking force exerted on the binding material located between said first and second brake bodies.

6. The binding arrangement as defined in claim 5, wherein said brake control plate includes an upwardly arched control surface; one said first second brake control element is in the form of a hinged member that is mounted to said binding material delivery arm such that it will contact said arched surface and force said control plate downwardly when rotating with said binding material arm in a first direction, but will fold so as to not affect the position of the control plate during movement of said binding material delivery arm in a direction opposite to said first direction.

7. The binding arrangement as defined in claim 6, wherein another of said second brake control elements is in the form of a flat plate mounted to said binding material delivery arm so as to lead said first brake control element by an angle of approximately 30°, as considered when said binding material delivery arm is pivoting in said first direction.

8. The binding arrangement according to claim 1, wherein said at least one binding material delivery arm is a first binding material delivery arm; a second binding material delivery arm being mounted form movement in concert with said first binding material arm for moving a delivery end of said second binding material delivery arm along a second transverse path located so as to be forward of a bale to be bound; said at least one brake being a first brake; and a second brake being associated with said second binding material delivery arm in a manner similar to the association between said at first brake and said first binding material arm.

9. A method of controlling the tension in a binding material being delivered by a binding arrangement including at least one binding material delivery arm mounted for movement during a binding cycle, so as to move a delivery end of the arm along a transverse path between starting and ending positions forward of a zone to be occupied by a circumference of a cylindrical bale, at least one cutting arrangement located between said ending position and said zone for severing the binding material so as separate it from a bound bale, and at least a first brake provided for engagement with said binding material, said method comprising:
 (a) establishing a pre-selected maximum braking force in said first brake;
 (b) controlling said first brake such that it effects a variable braking force such that:
  (i) a decrease in braking force occurs at the beginning of a binding cycle;
  (ii) increasing the braking force back to said maximum braking force until an end of the binding cycle is imminent;
  (iii) and once again decreasing the braking force approximately at the time that the binding material is being severed by the cutting arrangement.

10. The method of controlling the tension in binding material as defined in claim 9, and further including the step of:
 (c) eliminating the tension in said binding material at a location upstream of said cutting arrangement prior to said binding material being severed.

* * * * *